United States Patent [19]

Grant

[11] Patent Number: 5,058,631
[45] Date of Patent: Oct. 22, 1991

[54] FLEXIBLE GAS SALVAGE CONTAINERS AND PROCESS FOR USE

[75] Inventor: David C. H. Grant, Selbyville, Del.

[73] Assignee: Ashland Oil, Inc., Ashland, Ky.

[21] Appl. No.: 394,594

[22] Filed: Aug. 16, 1989

[51] Int. Cl.$^5$ .............................................. F25B 45/00
[52] U.S. Cl. ......................................... 141/10; 141/1;
141/11; 141/329; 141/315; 141/114; 62/149;
62/174; 62/77
[58] Field of Search ...................... 141/1, 10, 114, 313,
141/314, 315, 329, 330, 82; 62/149, 174, 77;
206/527

[56] References Cited

U.S. PATENT DOCUMENTS

| | | | |
|---|---|---|---|
| 3,232,070 | 2/1966 | Sparano | 62/149 |
| 3,487,656 | 1/1970 | Grant | 62/174 |
| 3,643,460 | 2/1972 | Garland | 62/174 |
| 3,892,058 | 7/1975 | Komatsu | 53/21 FC |
| 4,285,206 | 8/1981 | Koser | 62/126 |
| 4,363,222 | 12/1982 | Cain | 62/292 |
| 4,441,330 | 4/1984 | Lower et al. | 62/149 |
| 4,476,688 | 10/1984 | Goddard | 62/149 |
| 4,539,817 | 9/1985 | Staggs et al. | 62/149 |
| 4,554,792 | 11/1985 | Margulefsky | 62/77 |
| 4,646,527 | 3/1987 | Taylor | 62/85 |
| 4,766,733 | 8/1988 | Scuderi | 62/77 |
| 4,776,174 | 10/1988 | Rich et al. | 62/77 |
| 4,887,435 | 12/1989 | Anderson | 62/85 |
| 4,878,931 | 11/1989 | Grant | 62/17 |

OTHER PUBLICATIONS

Perimeter Concept for Solvent Emission Control, by David C. H. Grant presented at Int'l Conf. on CFC and Halon Alternatives, 10-11 Oct. '89.
Robert Bosch Hausgerate GmbH (2kd 51-4161-6902-00) Linde AG Publication (English trans.)
Pollution Measurement Corp., Oak Park, Il. (undated) "Gas Sampling Bags"
"Plan to Release CFC Coolants Produces Heat" Wall Street Journal, 9-6-89

Primary Examiner—Henry J. Recla
Assistant Examiner—Edward C. Donovan
Attorney, Agent, or Firm—Richard C. Willson, Jr.

[57] ABSTRACT

A process and system for recovering refrigerant from refrigeration systems without substantial contamination of the atmosphere. The system includes devices for removing refrigerant from the system under the vapor pressure of the refrigerant or with aid from a pump, a conduit for conveying the refrigerant from the system, and a collapsible bag constructed of a flexible material substantially impermeable to refrigerant and to air, having at least one inlet for introducing refrigerant to be salvaged and sealing means for sealing the inlet on the bag. After filling, the bags may be transported to a recovery system for recovering refrigerant from the bag so that the refrigerant may be purified and recovered for reuse.

3 Claims, 3 Drawing Sheets

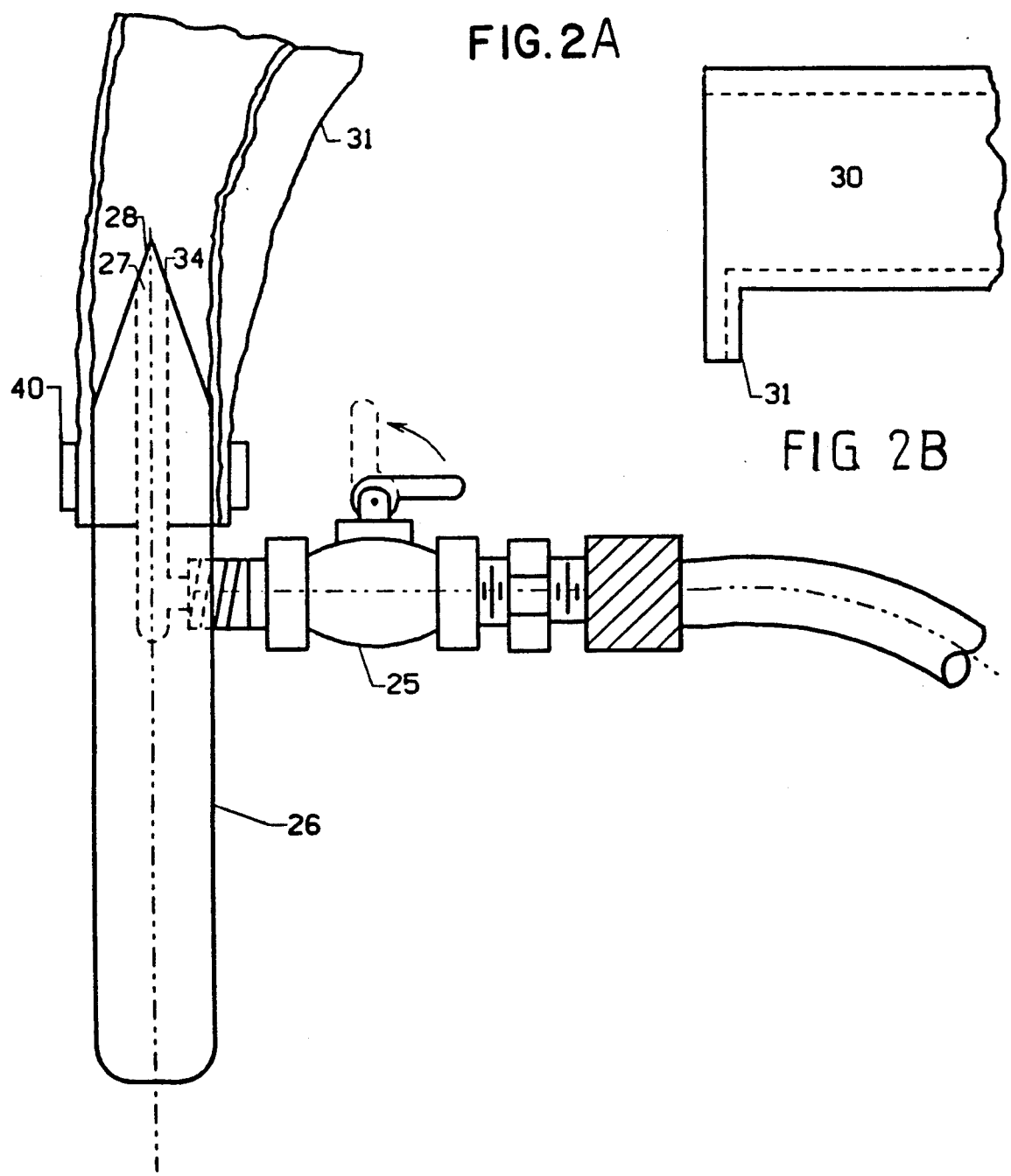
FIG. 2A
FIG 2B
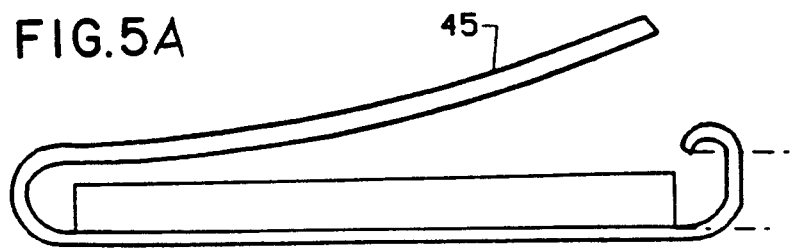
FIG. 5A
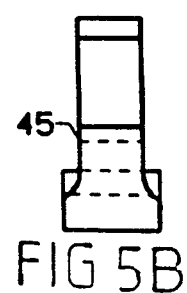
FIG 5B

FLEXIBLE GAS SALVAGE CONTAINERS AND PROCESS FOR USE

CROSS REFERENCE TO RELATED APPLICATION

U.S. Ser. No. 07/371,785 filed June 27, 1989 relates to the general field of recovery of refrigerants and names the same inventor as the present application and employs slack-sided accumulators which can be similar to the bags used in the present invention.

BACKGROUND OF INVENTION

The loss of refrigerant such as R-12 refrigerant from refrigeration systems, particularly during servicing of automotive air conditioning systems is the subject of much public concern at this time. A refrigeration service mechanic in servicing the air conditioning system normally vents the same. During venting, a significant amount of R-12 vapor is lost from the air conditioning system. There is a need, therefore, to provide a practical, simple, effective and low cost refrigerant recovery and restoration system which will allow the mechanic to vent an automotive air conditioning system with full recovery of the vapor contained therein, to provide a system which at least in part is relatively transportable to the situs of the automotive or like air conditioning or refrigeration system, which produces reclaimed refrigerant of equal quality in comparison to virgin refrigerant which is small in size, but which will be capable of operating with the volume of normal automotive air conditioning service operation.

Attempts have been made to produce an effective refrigerant recovery and/or disposal, purification and recharging system. Issued U.S. Patents representative of such known systems are: U.S. Pat. Nos. 3,232,070; 4,285,206; 4,363,222; 4,441,330; 4,476,688; 4,539,817; 4,554,792; 4,646,527; and 4,766,733.

These patents disclose as aspects of such refrigerant recovery systems the employment of components such as vacuum pumps, oil separators, condensers, liquid refrigerant receivers and accumulators. Unfortunately, the systems identified above are characterized by complexity and high pressure operation and are plagued with maintenance problems due particularly to the high pressure portions of the system.

It is therefore an object of the present invention to provide an improved, low cost, simple, essentially atmospheric pressure operated refrigerant recovery and restoration system which operates primarily as a direct condensation process, which has particular application to servicing automotive air conditioning systems, but is not limited thereto, and which may be advantageously employed in servicing home refrigerators or systems using R-12 as refrigerant, and which obviates the problems discussed above with respect to the known prior art.

All of the prior attempts to recover refrigerant have suffered from the difficulty that they require extensive apparatus to be brought to the site where the refrigerant is to be salvaged, or that the refrigeration unit being serviced has to be brought to a central reclaiming system. The present invention, by its use of approximately atmospheric pressure, bags which may be either reusable or even disposable, permits a refrigeration service engineer to fill a number of the bags at various locations where refrigerant is to be salvaged and, for example, at the end of his working day, return these bags to a central refrigeration recovery system where the refrigerant may be condensed and purified for reuse.

Another method which was used in the past for recovering refrigerant was to fill small pressure vessels with the refrigerant by compressing the refrigerant into the pressure vessels through the action of the compressor on the refrigeration unit from which the refrigerant is being withdrawn or by action of a liquid pump or a vacuum pump. As anyone connected with liquified compresses gas handling knows, over-filling of any pressure vessel is always of concern. Pressure relief devices are not always reliable and may fail to open after years of hard handling in and out of trucks, contamination by grease and oil, corrosion, etc. Therefore, the possibility of hydrostatic rupture and even explosion is always present when a pressure vessel is being filled. This danger is greatly extenuated when the filling is being done in the field under adverse circumstances and generally without any weighing device, often by only modestly experienced personnel.

It is an object of the present invention to provide a safe, low cost, simple, essentially atmospheric pressure refrigerant recovery system which avoids the need for bringing expensive, bulky equipment to the location from which the refrigerant is to be salvaged. Another object is to provide a reclaiming system which is light and small which can be brought to the salvage site. Still another object is to avoid having a mechanical reclaiming system for each service mechanic or for small companies which may not be able to justify the purchase of reclaiming systems. Still another object is to avoid the difficulty of smaller reclaiming systems which may take too long to recover the refrigerant vapor which is being salvaged. A further object is to provide a simple, easy to use, lightweight system to capture refrigerant vapor at the service site; to allow reclaiming at a later time without delaying the service work; and to allow a central reclaiming unit to reclaim refrigerant form a multiplicity of service men each servicing a multiplicity of refrigeration units. Another object is to avoid loss of CFC vapor to the atmosphere by making practical reclaiming of vapor from scrapped or disabled refrigerators and other refrigeration systems or those requiring servicing.

The present invention provides economic, convenience, and safety advantages over the solutions taught in the prior art because the bags used by the present invention are cheap and disposable or reusable, the bags take up virtually no space prior to their being filled, and the bags, if somehow overfilled, will merely rupture softly by tearing apart at the weld or elsewhere, without any danger of explosion due to high pressure rupture such as would be involved in the failure of a pressure vessel.

SUMMARY OF THE INVENTION

The present invention utilizes slack-sided bags (bladders or balloons) to contain refrigerant vapor from refrigeration units from which the refrigerant is to be salvaged, e.g. refrigerators which need compressor replacements, commercial cold display case units, household and commercial heat pumps, automotive air conditioners, and any other system which utilizes halogenated hydrocarbons or other liquifiable gases as refrigerants in connection with a compressor, condenser, and evaporator.

The present invention embodies the recognition that bags of a practical size can contain refrigerant vapor from automobiles, home refrigerators, supermarket display cases, etc. at substantially atmospheric pressure. For example, a typical household refrigerator contains 0.32 pounds of refrigerant which is equivalent to approximately 1 cubic foot at atmospheric pressure and 90° F. The refrigerant vapor capture apparatus is shown.

BRIEF DESCRIPTION OF THE DRAWINGS

FIGS. 2a and 2b show a schematic diagram of an improved valve for withdrawing refrigerant from the bag, using a commercial toggle valve and a convenient handle for filling the bags from a conventional refrigeration service man's gauge set and connecting hose.

FIGS. 5a and 5b show a typical clip for sealing the bag of FIG. 5.

DESCRIPTION OF THE PREFERRED EMBODIMENTS

Figure 1:
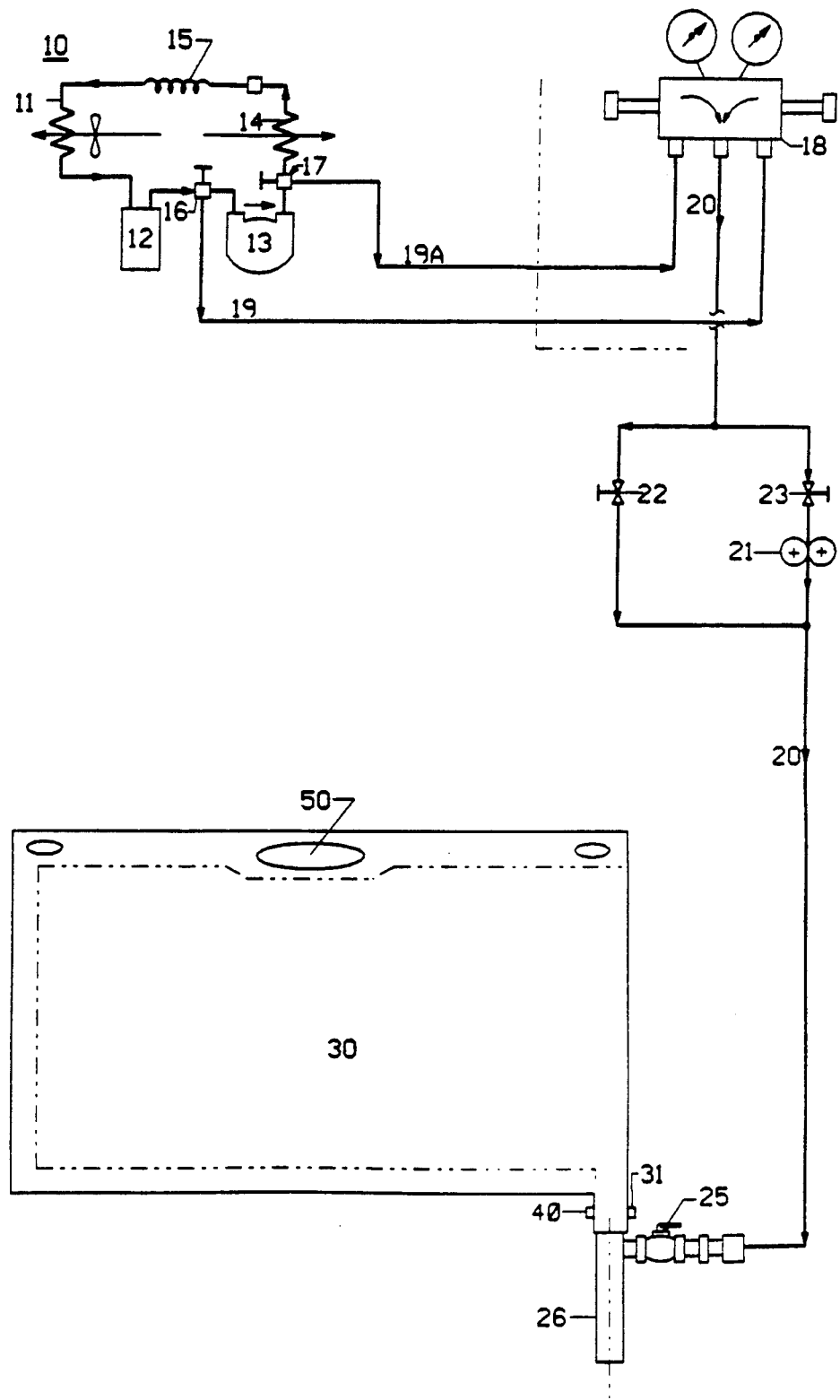
FIG. 1 is a schematic diagram of the overall system of the present invention showing the refrigeration system from which refrigerant is to be salvaged, the bag, and the refrigerant vapor capture system.

Referring to FIG. 1, 10 is a typical home refrigeration system showing the evaporator 11, the accumulator 12, the compressor 13, the condenser 14, and the capillary 15.

Figure 3:
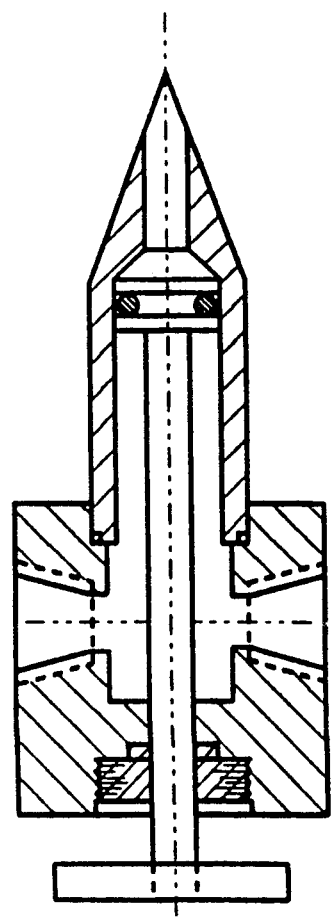
FIG. 3 is a section diagram of a simple valve for withdrawing refrigerant from the bag at the inlet to the refrigerant reclaim system.

A conventional piercing valve 16 is placed on the low pressure side of the compressor and a conventional piercing valve 17 is placed on the high pressure discharge of the compressor. Hoses 19 and 19a lead respectively from piercing valves 16 and 17 to conventional refrigeration service gauge set 18 which consists of a manifold with high and low pressure gauges connecting to hoses 19 and 19A. A third hose 20 leads from the gauge set to inlet valve 25. This connection between gauge set 18 and inlet valve 25 can optionally (not necessarily) be through a vacuum pump 21 with appropriate valves 22 and 23 to evacuate the refrigeration system. This vacuum pump would be particularly useful in salvaging refrigerant from an automobile air conditioner. Valve 25 is shown in detail in FIG. 3 and consists of a commercial toggle valve 25 mechanically connected to aluminum handle 26, and discharging through a longitudinal hole 27 drilled in the tapered end 28 of handle 26. A slack-sided bladder or accumulator 30 has an outlet 31 which fits snugly over the tapered end 28 of handle 26 and is further sealed by an elastic band 40 which is stretched over the bladder outlet 31 to compress it to the handle 26.

Referring again to FIG. 1, in operation, piercing valves 16 and 17 are placed onto the tubing of refrigeration system 10, a typical home refrigerator. (Only one piercing valve is required, but using one on the high side and one on the low side of the compressor speeds the expelling of refrigerant.) Refrigerant flows through tubes 19 and 19a into the refrigerant service gauge set 18 through hose 20 and optional vacuum pump 21 into valve 25 and through handle 26 into slack-sided accumulator 30. The slack-sided accumulator is flat when the refrigerant begins to flows in, and gradually expands to a plump pillow-like shape containing about 1.25 cubic foot in the bag. This volume is equivalent to approximately 0.4 pounds of refrigerant which is almost more than the 0.3 pounds contained in the refrigerator. When flow stops (as is easily observed by noting that the accumulator is no longer expanding), the accumulator is sealed with a clip 45 shown in FIG. 5 and elastic band 40 removed and the slack-sided accumulator slipped off the handle 26. The accumulator is easily carried or hung in a service truck from handle 50 which is an integral part of the accumulator.

After the service engineer has completed his workday, acquiring about one or more filled slack-sided accumulators or bags, he simply returns to the home shop and leaves the bags for condensing and purification of the refrigerant to be salvaged.

The refrigeration and recovery system can be completely conventional as shown in the U.S. patents mentioned under background of the invention, or can be of the novel configuration shown in my copending U.S. patent application Ser. No. 07/371,785.

The bags can be readily reused after the refrigerant has been expelled into the recovery/purification unit. The refrigerant is, of course, recycled for use in conventional refrigeration systems.

Though the above preferred embodiments have been described in a refrigeration system which would commonly use refrigerant 12, the system is also adaptable to recovery of refrigerants 11, 22, 502, 500, 503, 113, 114, and similar halogenated hydrocarbons. Other refrigerants may be recovered with the system, but these are less preferred because of toxic and possible corrosive hazards and because they are less commonly encountered in smaller refrigeration systems.

Bags

Figure 4:
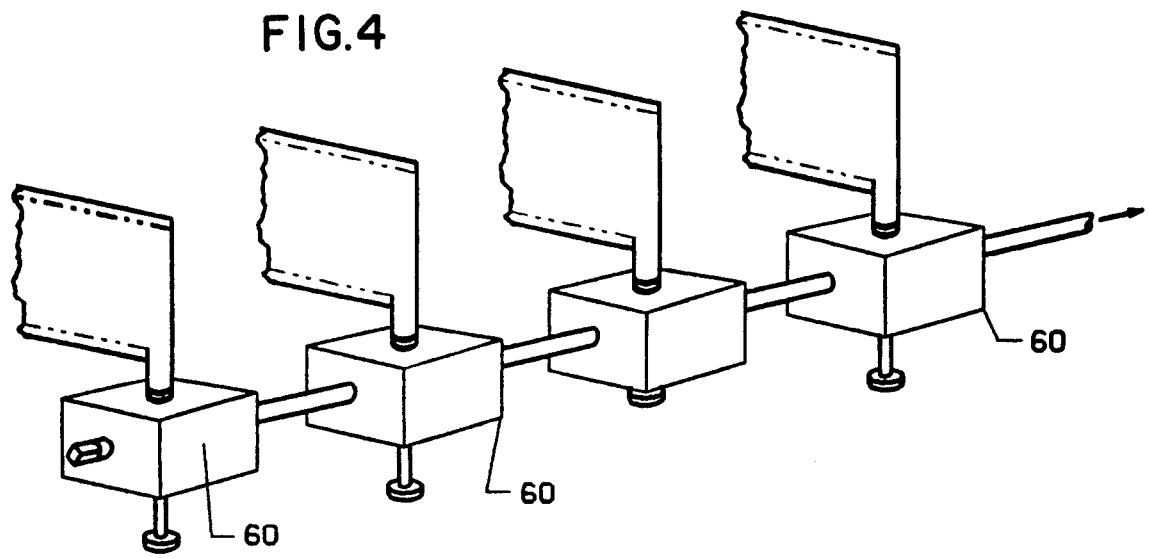
FIG. 4 is a manifold which is connected to the refrigerant recovery/purification system.

The bags for use with the present invention are not narrowly critical. For convenience and economy, they will preferably be made of sheet materials, preferably hot stamped and welded to shape. They may, of course, be of virtually any shape, though the rectangular configuration shown in the figures will be preferred. Tucks or gussets may be added to increase the volumetric capacity of the bag. The bag should be substantially impermeable to the gases they are to hold and to air because cross-contamination is undesirable as is well known in the refrigerant art. The bags can have specially formed fittings attached to their outlets but there is generally no need for this expense and additional weight. Instead, the bag will have a simple extension outlet long enough so that it may be folded over and clipped to seal the bag and also long enough to provide a good seal on the filling and withdraw valves 26 and 60 shown in FIGS. 1 and 4, respectively.

Additional details can be found in my copending application identified above.

Modifications

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein.

What is claimed is:

1. A process for the recovery of refrigerant from refrigeration systems comprising in combination:

a. filling a bag which is substantially impervious to said refrigerant and to air with said refrigerant through an opening connected to said refrigeration system;

b. transporting said bag to a central recovery system for recovering said refrigerant;

c. expelling said refrigerant from said bag at said central recovery system and condensing said refrigerant to a liquid and thereafter purifying said refrigerant for reuse.

2. A process according to claim 1 wherein said refrigerant is removed from said refrigeration system through an existing service connection or a puncture type valve which punctures said refrigeration system and conducts said refrigerant into said bag without substantial loss of said refrigerant to the atmosphere.

3. A process according to claim 1 wherein said bag has a handle or other means for carrying or hanging said bag.

* * * * *